United States Patent
Dunlay et al.

(10) Patent No.: US 11,948,466 B2
(45) Date of Patent: Apr. 2, 2024

(54) MISSION REASONER SYSTEM AND METHOD

(71) Applicant: Rockwell Collins, Inc., Cedar Rapids, IA (US)

(72) Inventors: Angela N. Dunlay, Marion, IA (US); Matthew M. Lorch, Cedar Rapids, IA (US); Subhashish Chakravarty, Marion, IA (US); Jaclyn A Hoke, Marion, IA (US); Bernard Dion, Monkton, VT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 551 days.

(21) Appl. No.: 17/035,416

(22) Filed: Sep. 28, 2020

(65) Prior Publication Data

US 2022/0101733 A1    Mar. 31, 2022

(51) Int. Cl.
| | |
|---|---|
| G08G 5/00 | (2006.01) |
| G06N 7/01 | (2023.01) |
| G07C 5/00 | (2006.01) |
| G07C 5/08 | (2006.01) |

(52) U.S. Cl.
CPC ............ *G08G 5/0021* (2013.01); *G06N 7/01* (2023.01); *G07C 5/008* (2013.01); *G07C 5/0808* (2013.01); *G08G 5/0013* (2013.01); *G08G 5/003* (2013.01)

(58) Field of Classification Search
CPC .... G08G 5/0021; G08G 5/0013; G08G 5/003; G06N 7/01; G07C 5/008; G07C 5/0808
USPC ........................................................ 701/14
See application file for complete search history.

(56) References Cited

U.S. PATENT DOCUMENTS

| | | | |
|---|---|---|---|
| 7,260,501 B2 | 8/2007 | Pattipatti et al. | |
| 7,421,419 B2 | 9/2008 | Maren | |
| 8,423,224 B1 | 4/2013 | Fuciarelli et al. | |
| 9,424,694 B2 | 8/2016 | Senalp et al. | |

(Continued)

FOREIGN PATENT DOCUMENTS

| | | |
|---|---|---|
| EP | 2028609 A2 | 2/2009 |
| EP | 2323005 B1 | 11/2016 |

(Continued)

OTHER PUBLICATIONS

Extended Search Report in European Application No. 21198662.5 dated Mar. 11, 2022, 10 pages.

*Primary Examiner* — Isaac G Smith
(74) *Attorney, Agent, or Firm* — Suiter Swantz pc llo

(57) ABSTRACT

A system and method for automation of flight functions across an aircraft cockpit provides an open systems architecture to meet next generation mission capabilities for increased aircrew effectiveness. A mission reasoner (MR) receives inputs from a vehicle health system, mission phase analysis, and external assets (wingmen) to build a decision network based on a knowledge database providing a decision aid to automate flight functions across the cockpit. The MR reduces crew workload by providing an automated decision aid and increased situational awareness of own ship aircraft and cooperating nearby vehicle health status relating to a phase of mission success. The MR provides predictive decisions and alternative actions to complete one or more desired mission objectives and determines predictive maintenance and future failures to optimize condition-based maintenance and reduce cost.

11 Claims, 9 Drawing Sheets

(56) References Cited

U.S. PATENT DOCUMENTS

| | | |
|---|---|---|
| 10,401,857 B2 | 9/2019 | Wang et al. |
| 10,676,048 B2 | 6/2020 | Dixit et al. |
| 10,964,130 B1* | 3/2021 | Dixit ................. G05B 23/0283 |
| 2003/0060942 A1 | 3/2003 | Kotzev et al. |
| 2010/0326264 A1* | 12/2010 | Roemerman ........... B64D 1/06 |
| | | 89/1.56 |
| 2014/0279809 A1 | 9/2014 | Hershey et al. |
| 2015/0025927 A1 | 1/2015 | Hershey et al. |
| 2015/0186335 A1* | 7/2015 | Senalp .................... G06F 30/20 |
| | | 703/2 |
| 2017/0295031 A1* | 10/2017 | Bush .................. H04L 63/1433 |
| 2018/0079530 A1* | 3/2018 | Wyrobek ................ B64F 1/029 |
| 2018/0362190 A1* | 12/2018 | Chambers ............ B64C 39/024 |
| 2019/0027047 A1* | 1/2019 | Kim ........................ G09B 9/003 |
| 2019/0033862 A1* | 1/2019 | Groden ................ G08G 5/0086 |
| 2019/0187727 A1* | 6/2019 | Reepmeyer .......... G08G 5/0034 |
| 2019/0215338 A1 | 7/2019 | Baggeroer et al. |
| 2020/0273350 A1* | 8/2020 | Litvova ................ G08G 5/0039 |
| 2022/0075693 A1* | 3/2022 | Mitani ................... G05B 23/02 |

FOREIGN PATENT DOCUMENTS

| | | |
|---|---|---|
| GB | 2450241 A | 12/2008 |
| WO | 2020163781 A1 | 8/2020 |

\* cited by examiner

MISSION REASONER SYSTEM AND METHOD

BACKGROUND

Task saturation may be a continuing issue during combat operations. Specifically, combat pilots are required to maintain situational awareness of not only all aspects of flight of their own aircraft but also external events surrounding a surface picture (current nearby events) and an air picture.

Mission commanders of multi-ship formations must maintain an increased situational awareness due to the fact that many aircraft (manned and unmanned) may be under their direct control or supervisory control and require continuous monitoring and occasional direction.

Any distraction internal or external to the fighter cockpit may decrease this situational awareness and directly impact a mission success. Even a few seconds of inattention to a particular task may cause disastrous results. A small abnormal issue internal to a fighter cockpit may cause minutes of inattention outside the fighter cockpit.

Many elements within a mission may possess a plurality of secondary capabilities unused during a primary mission. Should one element fail or become degraded, one easy answer is to send the degraded element home unused. This lack of accurate decision making may save time under stress but may cause elements to go unused while some useful task may remain. Once a mission may complete, lack of accurate mission related decisions may cause a certain latency to exist between a first mission and a subsequent mission leading to unused assets remaining idle.

Therefore, a need remains for a system and related method which may overcome these limitations and provide a novel solution to automation of flight functions and decision making across an aircraft cockpit to reduce pilot workload and enhance mission success.

SUMMARY

In one embodiment of the inventive concepts disclosed herein, a system for automation of flight functions across an aircraft cockpit may comprise a plurality of modules onboard an aircraft, the plurality of modules configured: 1) for a real time function during a mission and 2) to communicate with a plurality of architecture types. In some embodiments, the plurality of modules may include a mission planning module configured for planning the mission; a mission execution module including an execution command of the mission and a phase of mission analysis; a human machine interface (HMI) onboard the aircraft; a mission assessment module including a mission health assessment; a mission experience module; and a vehicle health system configured for monitoring at least one subsystem onboard the aircraft, the vehicle health system including a multi-vehicle health interface configured for monitoring a vehicle status of a plurality of vehicles offboard the aircraft.

The system may include a controller operatively coupled with each of the plurality of modules and a tangible, non-transitory memory configured to communicate with the controller, the tangible, non-transitory memory having instructions stored therein that, in response to execution by the controller, cause the controller to carry out each task of the system for automation of flight functions across an aircraft cockpit.

In one embodiment of the inventive concepts disclosed herein, the controller may receive the execution command of the mission and a mission execution status from the mission execution module, receive a phase of mission from the mission assessment module, and receive, from the vehicle health system, 1) a subsystem status of the at least one subsystem onboard the aircraft and 2) the vehicle status of at least one vehicle of the plurality of vehicles offboard the aircraft.

The controller may also determine 1) a subsystem degraded status of the at least one subsystem onboard the aircraft based on the received subsystem status and 2) a vehicle degraded status of at least one vehicle of the plurality of vehicles offboard the aircraft based on the received vehicle status, correlate each of the subsystem degraded status and the vehicle degraded status with the phase of mission, and determine a probability of mission success based on the correlation.

The controller may further determine at least one predictive decision aid based on 1) the subsystem degraded status, 2) the vehicle degraded status, and 3) the phase of mission, and 4) the probability of mission success, the at least one predictive decision aid configured to mitigate the subsystem degraded status and the vehicle degraded status on the probability of mission success, the at least one predictive decision aid one of: a subsystem procedure onboard the aircraft, a mission go of the mission, at least one mission retask of the mission, and a mission no go of the mission, execute the at least one predictive decision aid one of: onboard the aircraft and offboard the aircraft, communicate the at least one predictive decision aid to each of the plurality of modules during the real time function, and present the at least one predictive decision aid via the HMI to an operator of the aircraft.

An additional embodiment of the inventive concepts disclosed herein may include a method for automation of flight functions across an aircraft cockpit. The method may comprise receiving an execution command of a mission and a mission execution status from a mission execution module and receiving a phase of mission from a mission assessment module. The method may further include receiving, from a vehicle health system, 1) a subsystem status of at least one subsystem onboard an aircraft and 2) a vehicle status of at least one vehicle of a plurality of vehicles offboard the aircraft.

The method may include determining 1) a subsystem degraded status of the at least one subsystem onboard the aircraft based on the received subsystem status and 2) a vehicle degraded status of at least one vehicle of the plurality of vehicles offboard the aircraft based on the received vehicle status and correlating each of the subsystem degraded status and the vehicle degraded status with the phase of mission.

The method may also include determining a probability of mission success based on the correlation and determining at least one predictive decision aid based on 1) the subsystem degraded status, 2) the vehicle degraded status, 3) the phase of mission, and 4) the probability of mission success, the at least one predictive decision aid configured to mitigate the subsystem degraded status and the vehicle degraded status associated with the probability of mission success, the at least one predictive decision aid one of: a subsystem procedure onboard the aircraft, a mission go of the mission, at least one mission retask of the mission, and a mission no go of the mission.

The method may further include executing the at least one predictive decision aid one of: onboard the aircraft and offboard the aircraft, communicating the at least one predictive decision aid to each of: a mission planning module, the mission execution module, a human machine interface (HMI) onboard the aircraft, the mission assessment module, and a mission experience module, and the vehicle health system, and presenting the at least one predictive decision aid via the HMI to one of: an operator and a supervisor of the aircraft.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
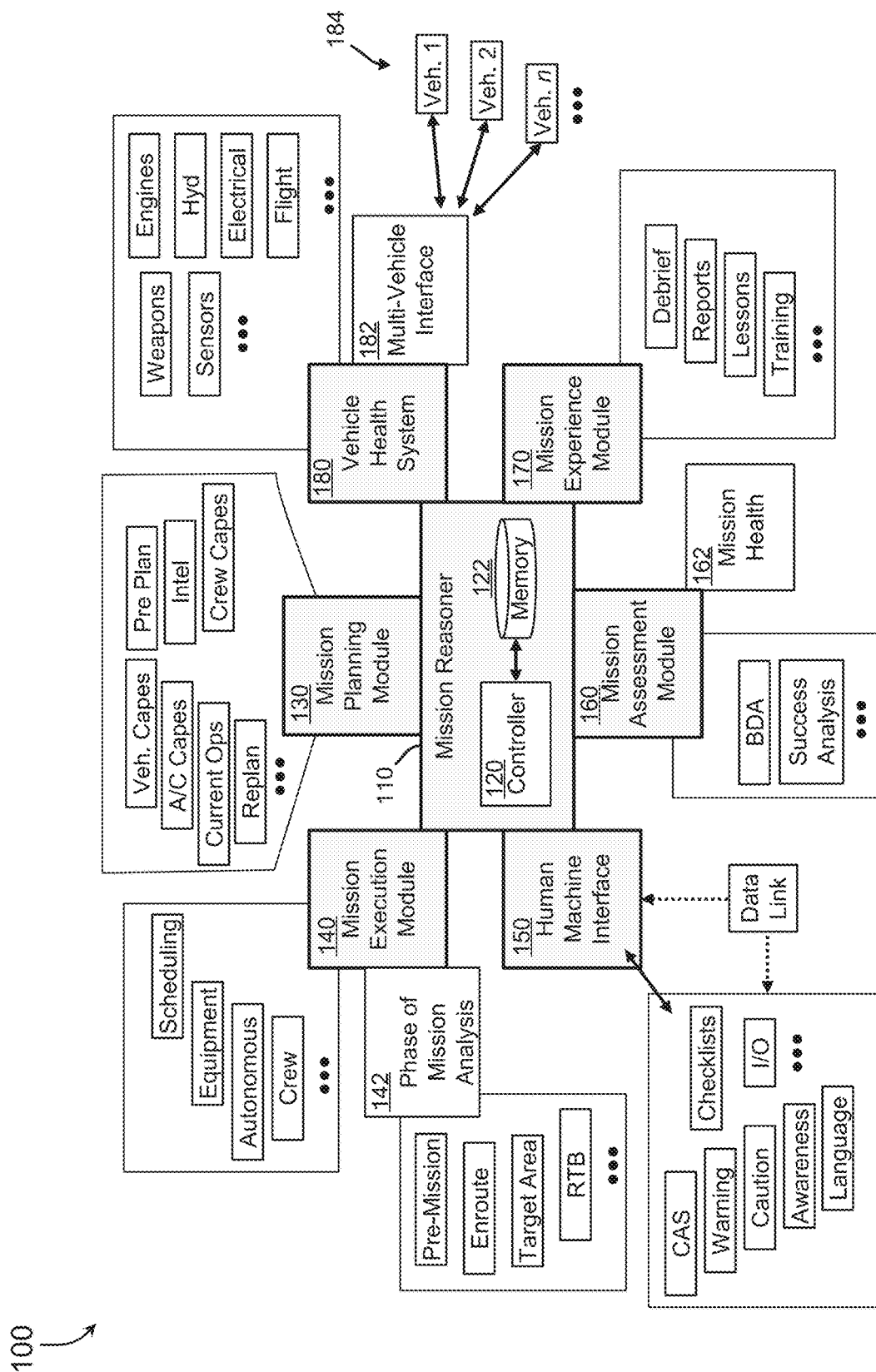
FIG. 1 is a diagram of a system for automation of flight functions across an aircraft cockpit in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for automation of flight functions across an aircraft cockpit. The systems herein provide an open systems architecture to meet next generation mission capabilities for increased aircrew effectiveness. A mission reasoner (MR) receives inputs from a vehicle health system, mission phase analysis, and external assets (multi-ship formations, wingmen) to build a decision network based on a knowledge database providing a decision aid to automate flight functions across the cockpit. The MR reduces crew workload by providing an automated decision aid and increased situational awareness of own ship aircraft and cooperating nearby vehicle health status relating to a phase of mission success. The MR provides predictive decisions and alternative actions to complete one or more desired mission objectives and determines predictive maintenance and future failures to optimize condition-based maintenance and reduce cost.

| REFERENCE CHART | |
|---|---|
| 100 | System Overview |
| 110 | Mission Reasoner (MR) |
| 120 | Controller |
| 122 | Memory |
| 130 | Mission Planning Module |
| 140 | Mission Execution Module |
| 142 | Phase of Mission Analysis |
| 150 | Human Machine Interface (HMI) |
| 160 | Mission Assessment Module |
| 162 | Mission Health |
| 170 | Mission Experience Module |
| 180 | Vehicle Health System (VHS) |
| 182 | Multi-Vehicle Interface |
| 184 | Plurality of Vehicles |
| 200 | Partial Expanded View |
| 300 | Vehicle Health Expanded |
| 400 | Exemplary MR Application |
| 422 | Knowledge Base |
| 450 | Output to HMI |
| 480 | VHS Output |
| 500 | MR Example Ontology |
| 600 | Mission Reasoner Workflow |
| 700 | Mission Ecosystem |
| 800 | HMI Diagram |
| 850 | Forward Panel |
| 852 | Aircraft Graphic |
| 854 | Mission Status |
| 856 | Warning Display |
| 858 | Advisory Display |

FIG. 1

System Description

Referring to FIG. 1, a diagram of a system for automation of flight functions across an aircraft cockpit in accordance with an embodiment of the inventive concepts disclosed herein is shown. Generally, a system for automation of flight functions across an aircraft cockpit 100 may provide a pilot with mission effectiveness for a given aircraft status as well as additional external parameters. The system for automation of flight functions across an aircraft cockpit 100 may include a plurality of modules sited onboard an aircraft embedded within a mission reasoner (MR) 110. The MR 110 may be tasked with automation of a plurality of decisions the pilot of an aircraft may be required to make during a mission.

The system for automation of flight functions across an aircraft cockpit 100 may provide an open systems architecture to meet next generation mission capabilities for increased aircrew effectiveness within a multi-domain operation (MDO). One exemplary open system architecture within which the MR 110 may function may include a Future Airborne Capability Environment (FACE™) configured for cross domain communication between at least two diverse architecture types. The MR 110 may receive inputs from a vehicle health system, mission phase analysis, as well as external assets to build an explainable decision network based on a knowledge database providing a decision aid to automate flight functions across the cockpit. Generally, the MR 110 may reduce crew workload providing an automated decision aid and increased situational awareness of vehicle health status. The MR 110 may provide mitigation and alternative actions to complete one of more mission objectives; and determine predictive maintenance to optimize condition-based maintenance and reduce cost.

In one embodiment of the inventive concepts disclosed herein, the plurality of modules may be configured for real time function during a mission and also configured to communicate via an open architecture connectivity with a plurality of architecture types. Architecture types may include differing aircraft types supporting differing flight control or mission computers, different data bus types, and multiple languages. For example, the MR 110 using the open architecture may be specifically configured for operation and communication with transport category aircraft (e.g., C-17) from diverse manufacturers and countries, a plurality of unmanned aircraft systems (UAS) types, as well as diverse fighter aircraft. Each type of aircraft may effectively communicate with the MR 110 while maintaining a different architecture type including a data communication system as well as a mission computer and flight management controller.

In embodiments, the MR 110 including the plurality of modules may reside within the aircraft enabling local processing of each of the MR 110 decision aids. Since local decisions within the cockpit may directly affect own ship actions as well as wingman actions, the local decisions may enable the pilot more time to focus on additional decisions vital to mission success.

In certain circumstances, a mission hierarchy or command structure may include supervisory control (human on the loop versus human in the loop) with direct intervention available enabling human taking full control (versus providing high-level tasking) when necessary. The system for automation of flight functions across an aircraft cockpit 100 may provide such structure.

In one embodiment of the inventive concepts disclosed herein, the plurality of modules may include a mission planning module 130 configured for one or more aspects of planning the mission. The mission planning module may access data such as crew capabilities (capes), intelligence, preplanning assets, vehicle and aircraft capes, current operations, and replanning resources. In one example, the mission planning module 130 may maintain the real time function operating during a mission in planning a next mission. The mission planning module 130 may include a mission preplanning ability, an enroute dynamic mission re-planning strategy, a capability of the aircraft, a capability of the plurality of vehicles, and a capability of the operator of the aircraft. The MR 110 may employ each of the plurality of modules before, during, as well as after the mission.

In one embodiment of the inventive concepts disclosed herein, the MR 110 may include a mission execution module 140 including an execution command of the mission. The mission execution module 140 may include a scheduling of the mission, a single pilot and a reduced crew operation status, an equipage capability of each of the plurality of vehicles and the aircraft, a weapons capability associated with each of the aircraft and the plurality of vehicles, and a chain of communication for a weapon employment.

Further, the mission execution module 140 may include scheduling, equipment required for a mission, autonomous operations, and crew requirements to adequately staff the desired mission. The mission execution module 140 may also include a phase of mission analysis 142 discussed below to aid the MR 110 in determining a specific decision aid to execute at the appropriate time and phase of the mission. Mission assessment 142 may function to determine a phase of the mission including a pre-mission, enroute portion, operations in a target area, and a return to base (RTB) phase of each mission.

In one embodiment of the inventive concepts disclosed herein, the MR 110 may include a human machine interface (HMI) 150 onboard the aircraft. The HMI 150 may include a display screen, a voice recognition and communication system, a helmet mounted display, and an aural warning system. The HMI 150 may be one aspect of exchange between aircrew and the MR 110 as well as additional autonomous systems. Included within the HMI 150, a crew alerting system (CAS) may use sensory aspects of the pilot to gain the pilots attention to a specific issue. The HMI 150 also may include a warning, caution, and awareness presentations along with checklist presentation and pilot input output (I/O) functions.

In addition, the HMI may include an interface between a UAS and a remote operator of the UAS. A datalink and/or direct supervisory communication between the UAS with the onboard HMI and the remote operator/supervisor may enable direct supervisory control of the UAS as well as decision monitoring via the MR 110.

In one embodiment of the inventive concepts disclosed herein, the MR 110 may include a mission assessment module 160 including a mission health assessment 162. The mission assessment module 160 may a completion analysis of the mission, an analysis of subtasks associated with the mission, and a battle damage assessment of each of the aircraft and the at least one vehicle. It may assess mission success measuring mission performance against specific benchmarks of successful performance as well as a battle damage assessment (BDA) of each aircraft and vehicle participating within the mission.

In one embodiment of the inventive concepts disclosed herein, the MR 110 may include a mission experience module 170. The mission experience module 170 may provide debrief availability to pilots, create reports of mission activities, determine lessons learned during successful and unsuccessful missions, and assist training to further provide training assets to crewmembers. The Mission Experience module 170 may include a debrief of a mission subtask, an event log of a mission timeline, at least one lesson learned, a dynamic situational awareness knowledge graph, and a communication link to a at least one supplier of a material related to the mission. The mission experience module 170 may also include elements pertaining to "what happened during the mission" and "what were the lessons learned from the mission" with representative elements such as a dynamic situational awareness knowledge graph (DSAKG). The DSAKG may provide predictive maintenance to allow logistics and supply chain data warehouses to expedite ordering of components degraded in the mission.

In one embodiment of the inventive concepts disclosed herein, the MR 110 may include a vehicle health system (VHS) 180 configured for monitoring at least one subsystem onboard the aircraft. Also, the vehicle health system 180 may include a multi-vehicle health interface 182 configured for monitoring a vehicle status of a plurality of vehicles offboard the aircraft. Onboard the aircraft, the vehicle health system 180 may monitor onboard subsystems including an engine health, a hydraulic subsystem, an electrical subsystem, a flight control subsystem, etc. The vehicle health system 180 may further monitor additional subsystems such as a sensor subsystem and a weapons subsystem. Subsystems onboard the aircraft may further include a pneumatic system and a navigation system.

Offboard the aircraft, the multi-vehicle interface 182 may enable the MR 110 to monitor each offboard vehicle 184 in a similar manner as it may monitor the onboard subsystems. Each offboard vehicle 184 may periodically report to the MR 110 via the multi-vehicle interface 182 a status and health of each subsystem onboard the vehicle.

In one embodiment of the inventive concepts disclosed herein, the MR 110 may include a controller 120 operatively coupled with each of the plurality of modules. The controller 120 may be embedded within a mission processor or a mission computer onboard the aircraft as well as a stand-alone processor configured for providing function to the MR 110. The MR 110 may also include a tangible, non-transitory memory 122 configured to communicate with the controller 120, the tangible, non-transitory memory 122 having instructions stored therein that, in response to execution by the controller 120, cause the controller 120 to perform each assigned task of the MR 110.

System Function

In one embodiment of the inventive concepts disclosed herein, the MR 110 may present the pilot with plurality of decision aids to enhance the success of the mission. Decision aids may include a go decision, a no-go decision, and a plurality of retasking and replanning decision aids dynamically updated throughout the mission. To enhance situational awareness, with given inputs and data analysis the MR 110 may offer the pilot or mission commander a result of an executed decision (the what) as well as a choice of decisions as well as the reasoning behind each decision (the why).

The MR 110 may enhance decision making autonomy by enabling mission continuance in degraded system health situations. The MR 110 may add a probabilistic layer of mission completion analysis alongside the VHS 180. The probabilistic layer may be encoded as a causal Bayesian Network (causal BN) relating a remaining useful life (RUL) of components relevant to mission completion using conditional probabilities. These conditional probabilities may be stored with the memory 122 (expert knowledge) as well as learned from past data (learned knowledge). The outputs of the causal BN may include probabilities corresponding to mission-go, no-go and/or mission-replan conditional probabilities (posterior probabilities).

In one embodiment of the inventive concepts disclosed herein, the MR 110 may receive the execution command of the mission and a mission execution status from the mission execution module 140. Here, having previously planned a mission via the mission planning module 130, the execution command may signal the start of the mission. The MR 110 may also receive a phase of mission from the mission assessment module 160 indicating where in the mission timeline the aircraft and associated vehicles 104 may be positioned. For example, one exemplary phase of mission may include the enroute portion of the mission where the assets (aircraft and vehicles operating as a team or flight) may be flying from a base of operations to a target area. Here, the enroute phase of mission may include an aerial refueling operation as well as operational checks of mission essential subsystems onboard each of the aircraft and the plurality of vehicles 184.

The MR 110 may receive, from the VHS 180, 1) a subsystem status of the subsystems onboard the aircraft and 2) the vehicle status of one or more of the plurality of vehicles 184 offboard the aircraft. For example, once subsystem status may include a hydraulic subsystem status onboard the aircraft. Sufficient quantity, pump status, and sufficient pressure to continue the mission may be exemplary items reported from the VHS 180 to the MR 110. From one of the vehicles 184, similar subsystem status may be periodically reported to the MR 110. For example, a vehicle 184 may report a weapons status as well as a vehicle status to ensure the vehicle 184 is fit to continue with the planned mission.

In one embodiment of the inventive concepts disclosed herein, the MR 110 may determine 1) a subsystem degraded status of the subsystem onboard the aircraft based on the received subsystem status and 2) a vehicle degraded status of a vehicle offboard the aircraft based on the received vehicle status. Here, if all subsystems onboard the aircraft as well as all subsystems on each vehicle are fully operational, the MR 110 may continue the mission as planned without making any changes. However, should any subsystems be degraded, the MR 110 may take action to change the status quo.

In embodiments, the MR 110 may correlate each of the subsystem degraded status and the vehicle degraded status with the phase of mission to determine if the degraded status may affect the mission success. Here, the MR 110 may determine that the phase of mission may lead to no changes to the current operation. For example, during an RTB phase of mission, with a minor subsystem issue such as a failed hydraulic subsystem where a backup hydraulic subsystem may provide all function, the MR 110 may determine no change to the status quo of returning all assets to the base of operations. However, during a more active phase of mission (e.g., in a target area), the MR 110 may determine a retask or replan may be required.

In one embodiment of the inventive concepts disclosed herein, the MR 110 may determine a probability of mission success based on the correlation. Here, the MR 110 may determine the probability of mission success to be relatively high in which caused the MR 110 may make no changes to the current plan. However, should the correlation reveal a lower probability of mission success, the MR 110 may determine a change may be required. For example, should the aircraft lose one of two onboard engines during the enroute phase of mission, the MR 110 may determine a low probability of mission success and determine a change may be necessary to maintain safety of assets.

In one embodiment of the inventive concepts disclosed herein, the MR 110 may determine a predictive decision aid based on 1) the subsystem degraded status, 2) the vehicle degraded status, and 3) the phase of mission, and 4) the probability of subsystem or component failure within the remaining mission duration. Here, the predictive decision aid may be useful and configured to mitigate the subsystem degraded status and the vehicle degraded status on the probability of mission success. In our above example of a single engine failure, the MR 110 may determine one predictive decision aid may be for the aircraft to RTB to avoid further loss of the pilot or asset.

In embodiments, the predictive decision aid may include a subsystem procedure onboard the aircraft, a mission go of the mission, at least one mission retask of the mission, and a mission no go of the mission. Here, the MR 110 may automate an emergency procedure onboard the aircraft. For example, for the single engine failure, the MR 110 may execute the procedures required to comply with an emergency checklist. For example, 1) thrust lever to off, 2) engine control switch to manual, 3) ensure fuel pumps on, 4) affected engine thrust lever to idle to attempt a restart. In this manner, the MR 110 may execute the predictive decision aid onboard the own ship aircraft and offboard the aircraft relating to one of the plurality of vehicles 184. This automation of emergency procedures may improve safety and reduce workload on pilots and crew enabling more rapid decisions regarding continued mission execution.

Similarly, the MR 110 may automate decisions relating to the overall mission in multi-ship decision making. A mission go predictive decision aid may include all assets continuing on the planned mission as well as one or more assets RTB while the remaining assets continue. For example, should one of the plurality of vehicles 184 loose a weapons system, the MR 110 may execute a predictive decision aid to command the degraded vehicle to RTB while the remaining assets continue.

A mission no go predictive decision aid may include a single asset commanded to RTB while remaining assets continue with the planned mission or a failure of substantial impact that all assets may be commanded to RTB. A mission retask may include a plurality of tasking where the MR 110 may command an asset (aircraft and vehicle) to perform an alternate task than was initially planned. The MR 110 may employ the mission planning module 130 to determine which asset may be directed to perform an alternate task.

For example, should an autonomous vehicle of the plurality of vehicles 184 lose a weapon status but have remaining fuel on board to supply another asset, the MR 110 may retask the degraded autonomous vehicle 184 to perform a tanker mission and give unused fuel to another of the assets. In this manner, the MR 110 may direct each asset to perform a useful retask of a secondary mission when the degraded asset may be unable to perform a primary mission.

In one embodiment of the inventive concepts disclosed herein, the MR 110 may communicate the predictive decision aid to each of the plurality of modules during the real time function and present the predictive decision aid via the HMI to an operator of the aircraft. Here, as pilot situational awareness is desired, the MR 110 may keep the pilot appraised of automated actions as well as each predictive decision aid made to further the success of the mission. Also, in communicating each predictive decision aid to the plurality of modules, the MR 110 may enhance subsequent mission success by decreasing a turnaround time of degraded assets needing a repair.

The memory 122 may include predefined models of a particular situation in which the MR 110 may command a specific predictive decision aid related to an associated plurality of degradation models. In this manner, the MR 110 may react to causation of a specific degradation and explain to the pilot why it referred a particular action.

In addition, to maintain pilot situational awareness, the MR 110 may allow pilot queries of predictive decision aid in real time about why and what the MR 110 is doing. Here the query may include explain ability metrics as well as causality function given to this decision framework of the MR 110. The HMI 150 may be specifically configured for the pilot query in natural language to enable continuous attention to additional priorities.

In one embodiment of the inventive concepts disclosed herein, the MR 110 may be employed within a manned platform. However, the MR 110 may be directly applicable to employment on an unmanned platform (UAS) as well. Here, a team including only unmanned assets may directly benefit from the function of the MR 110. The MR 110 may enable purely autonomous decision making for tasking and retasking in this context, and it may remove the HMI component from the mission employment asset and replace the HMI to within a supervisory element.

FIG. 2

Figure 2:
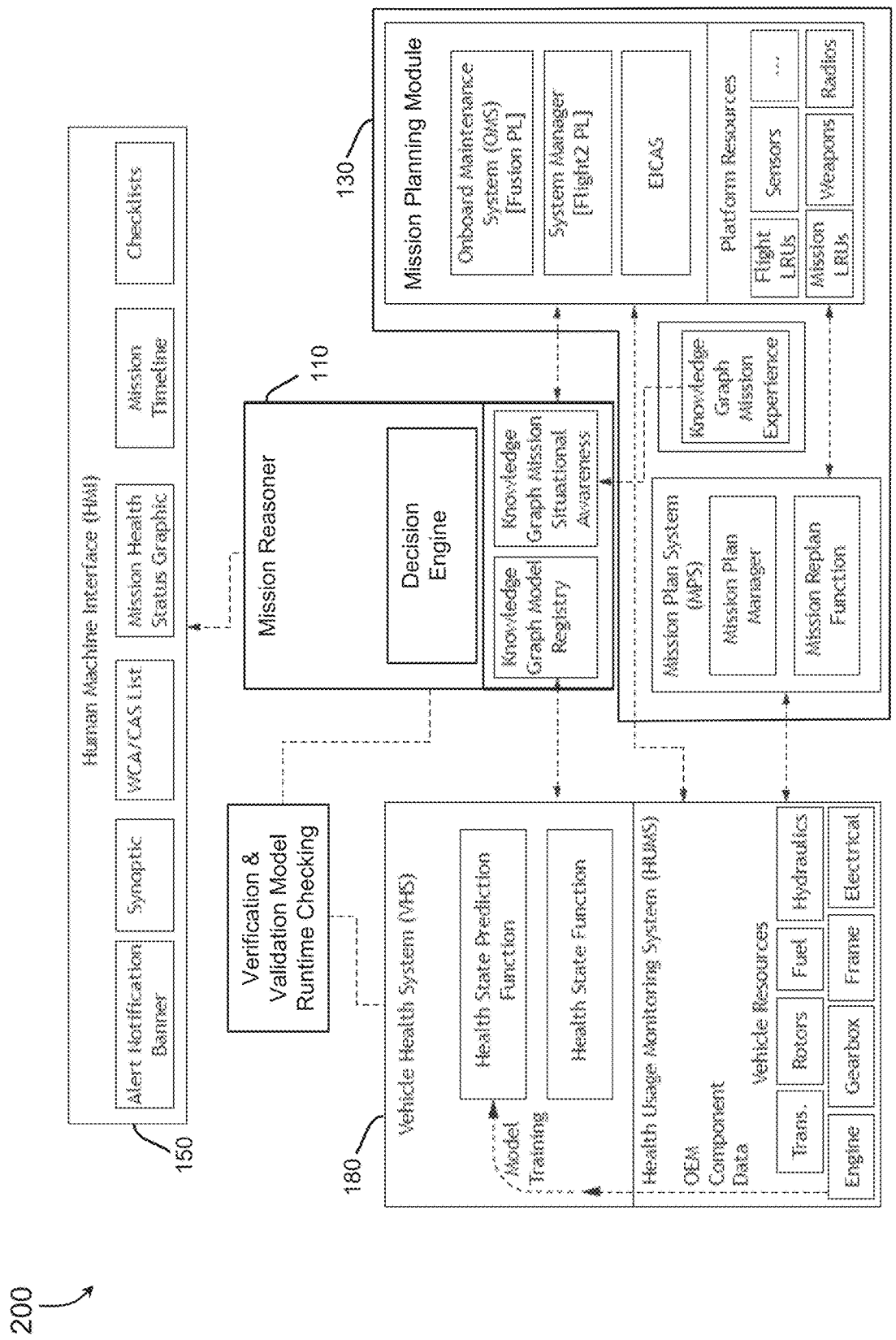
FIG. 2 is a partial exploded diagram of the mission reasoner in accordance with an embodiment of the inventive concepts disclosed herein.

Referring now to FIG. 2, a partial exploded diagram of the mission reasoner in accordance with an embodiment of the inventive concepts disclosed herein is shown. A partial expanded view 200 may include one topology of how the HMI 150 may receive output from the MR 110 via the VHS 180 and the mission planning module 130.

In one embodiment of the inventive concepts disclosed herein, the HMI 150 may include exemplary notifications including an alert notification banner, a synoptic display, a list of warning caution advisory (WCA) and CAS, mission health, mission timeline, and checklists.

In embodiments the MR 110 may include an exemplary decision engine configured for generating the predictive decision aid based on the inputs from each of the plurality of modules. The decision engine may rely on a knowledge graph model registry, a knowledge graph mission situational awareness, as well as a knowledge graph mission experience for additional input for determining the predictive decision aid.

Additionally, the mission planning module 130 may include a plurality of actors to aid in mission planning as well as replanning. A mission plan system may include a mission plan manager to determine mission pre-planning functions using onboard maintenance, system manager, platform resources, and engine indication and crew alerting system (EICAS) history. Also, a mission replan function to aid the MR 110 in re-planning should the MR 110 determine a retask or replan predictive decision aid.

The VHS 180 may include a health state prediction function and a health state function as well as a health usage monitoring system (HUMS) based on vehicle resources and original equipment manufacturer (OEM) component data. Between the VHS 180 and the MR 110, a verification and validation model (see FIG. 6) including a runtime checking function may function to ensure valid data may flow from the VHS 180.

FIG. 3

Figure 3:
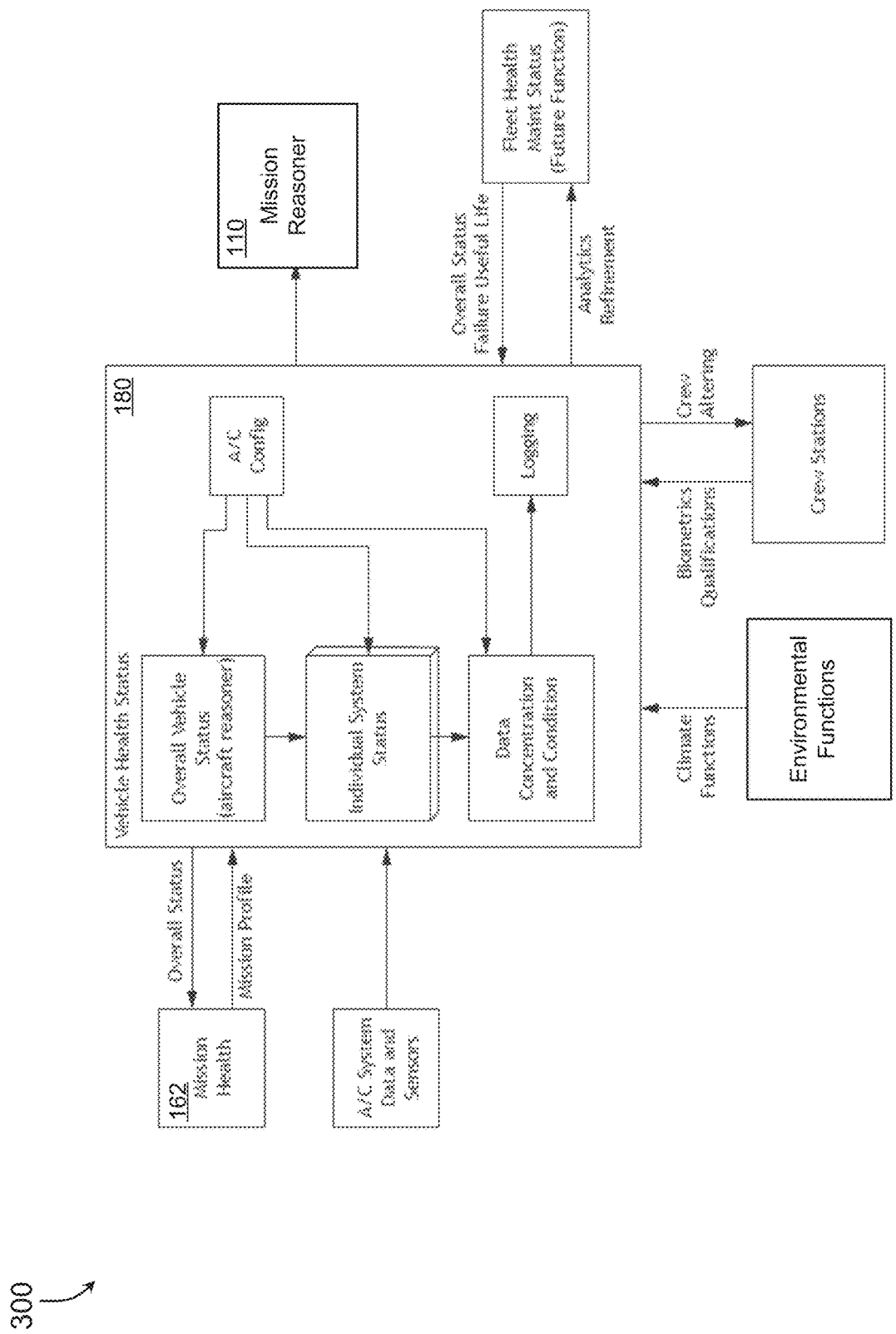
FIG. 3 is an exploded diagram of the vehicle health system exemplary of an embodiment of the inventive concepts disclosed herein.

Referring now to FIG. 3, a exploded diagram of the vehicle health system exemplary of an embodiment of the inventive concepts disclosed herein is shown. An exploded view 300 of the VHS 180 may indicate addition detail of inputs to the VHS 180. Exemplary inputs may include aircraft system data and sensors, environmental functions, crew stations data including biometric information, and fleet health.

In one embodiment of the inventive concepts disclosed herein, the MR 110 may integrate the sensor values, the RUL of relevant components, the mission profile and the evaluation of mission success from the causal BN into a dynamic Knowledge Graph (KG) to have a complete operating picture of own-assets during the mission. This KG may aid in reducing mental workload of pilots and aircrew by providing a reasoning behind the predictive decision aid, a trend for overall system health and individual components in real-time, and an end of mission automated reporting to ensure safe operation of used assets.

FIG. 4

Figure 4:
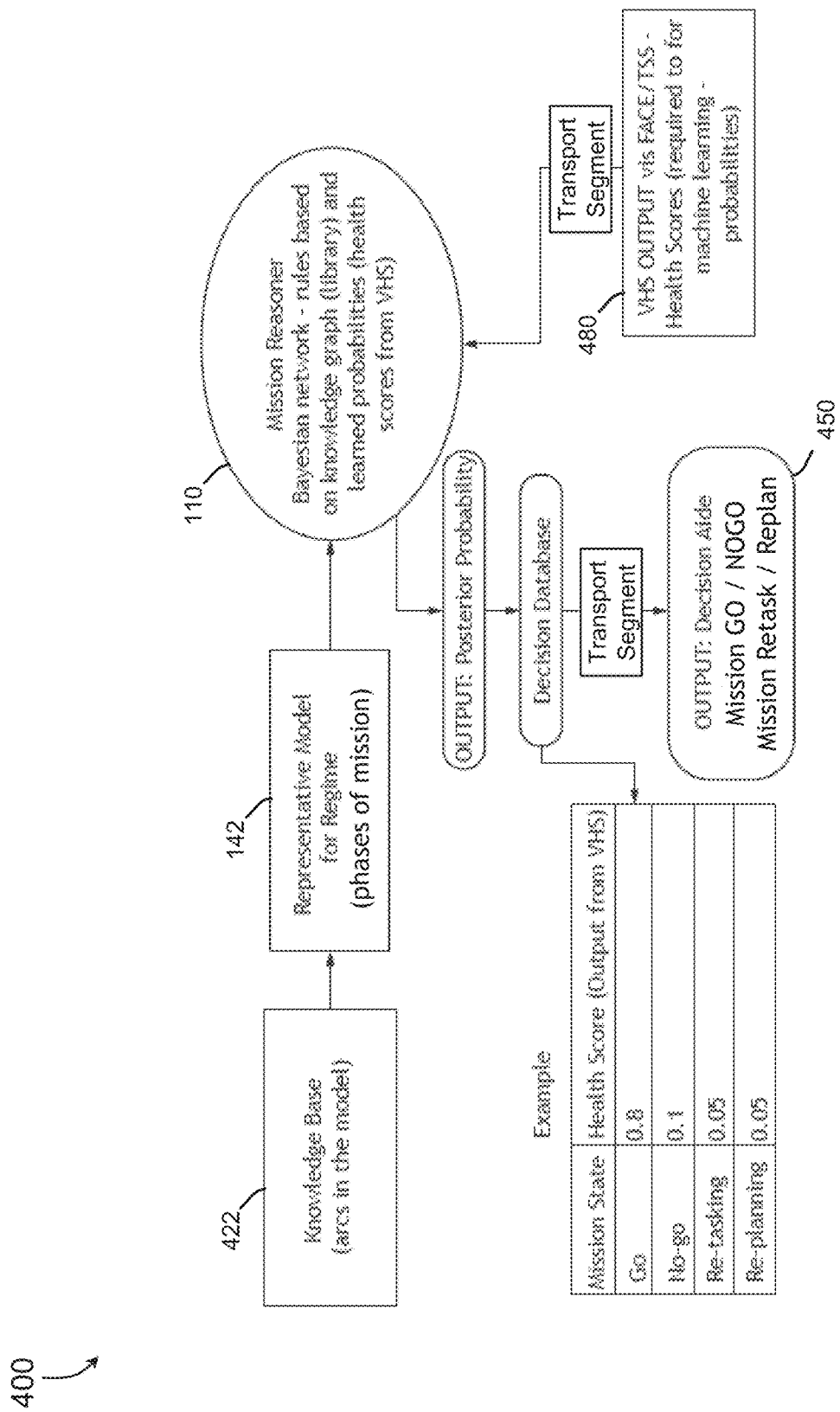
FIG. 4 is a diagram of a mission reasoner application exemplary of one embodiment of the inventive concepts disclosed herein.

Referring now to FIG. 4, a diagram of a mission reasoner application exemplary of one embodiment of the inventive concepts disclosed herein is shown. An Exemplary MR application 400 may detail how the MR 110 may function within the purity of architecture types. The MR 110 may operate with different types of onboard VHS 180 (e.g., fighter, transport, UAS) to provide learned probabilities used to build the decision aiding model required for automation. This gives the MR 110 one advantage in providing accurate predictive decision aids independent of aircraft by capitalizing on the open architecture concept using the FACE architecture. Here, one exemplary conceptual architecture may be employed to achieve this type of adaptability within an open architecture.

In one embodiment of the inventive concepts disclosed herein, the MR 110 may receive analysis for a knowledge base 422 stored within the memory 122 accessed via a representative model for each regime (phase of mission) from the phase of mission analysis 142. A VHS output 480 combined with the phase of mission may enable the MR 110 to determine the predictive decision aid including a posterior probability analyzed in light of a decision database. Here, one exemplary output may include a mission go score of 0.8, a mission no go score of 0.1, and each of the retasking and replanning values at 0.05 indicating a high probability of mission success. An HMI output 450 routed via a transport segment may include one or more of the predictive decision aid concerning the mission status.

In one embodiment of the inventive concepts disclosed herein, the MR 110 may employ the causal BN in a causal framework to assign causes to why the MR 110 made a particular predictive decision aid (e.g., declared the mission is a no go). This causal Bayesian analysis may detail what the pilot may see while the MR 110 functions in the background. Here, the MR may include an explain ability network so the pilot may determine exactly what decision the MR 110 commanded as well as why the decision was commanded. The explain ability of the MR 110 may translate to operator trust as well as manager trust in performing a specific way or commanding a specific decision.

FIG. 5

Figure 5:
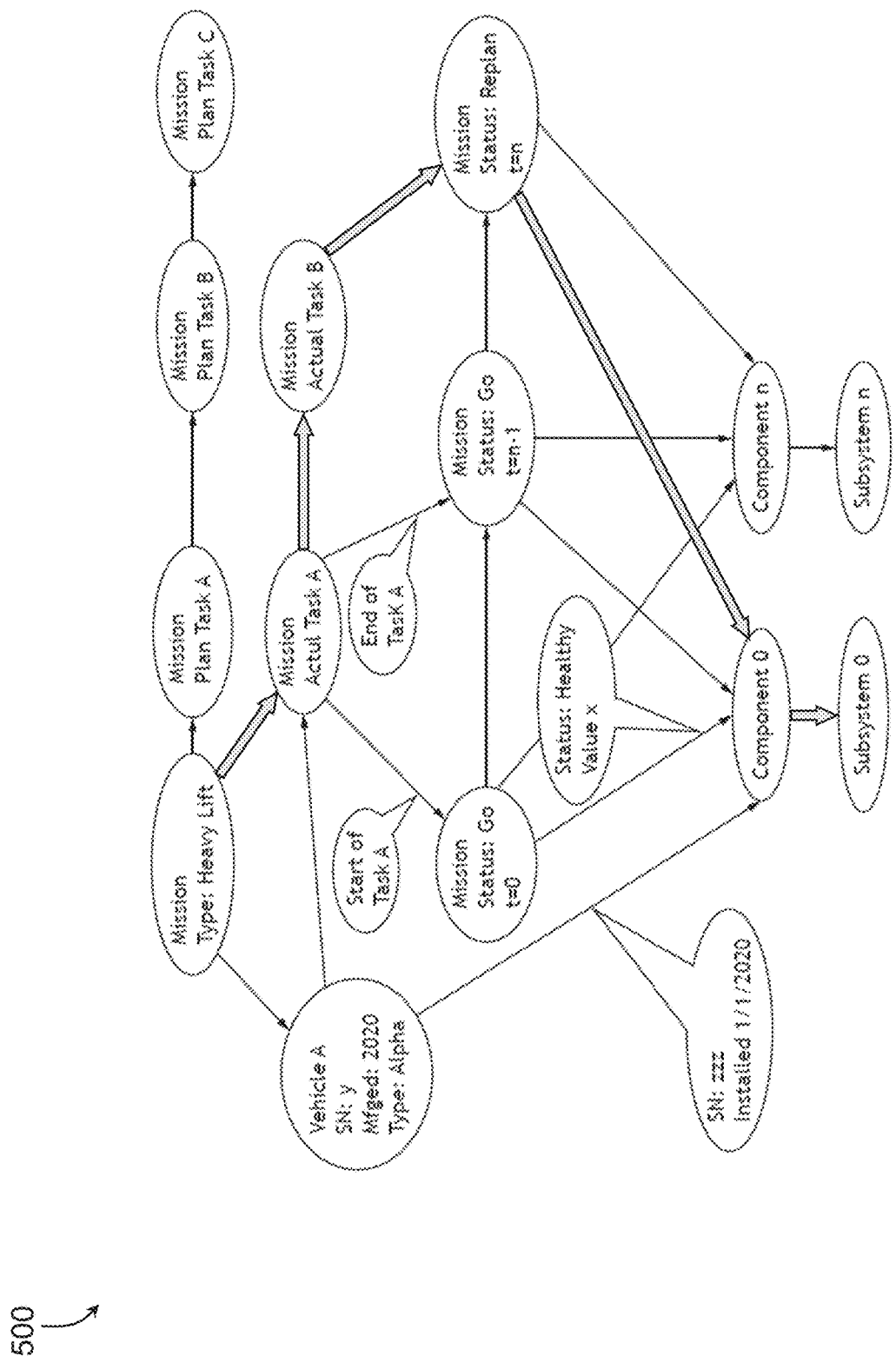
FIG. 5 is a diagram of a mission reasoner example ontology in accordance with one embodiment of the inventive concepts disclosed herein.

Referring now to FIG. 5, a diagram of a mission reasoner example ontology in accordance with one embodiment of the inventive concepts disclosed herein is shown. A MR Example Ontology 500 may include a plurality of causal paths the MR 110 may take to determine a predictive decision aid.

Here, the open architecture concept may include the causal BN, built from learned health scores provided by the Vehicle Health System 180 and a knowledge database stored within the memory 122. The arcs (arrows) of the causal BN may be defined as decision requirements.

In one embodiment of the inventive concepts disclosed herein, stored within the memory 122, mission relevant subjective probability estimates are available to the MR 110 in the event there is no historical data from prior missions to enable learning the structure of the causal BN.

The MR 110 may determine the RUL of a subsystem component in a particular mission phase from past simulations of models of degradation. The MR 110 may transform this RUL into a categorical scale corresponding to three states of failed, degraded, and working. If prior mission data is available, the MR 110 may employ this data to learn the structure of the relevant causal BN. The causal BN model may be integrated with an additional verification module which develops runtime monitoring checks to build trust and safety in the overall performance of the MR 110. The MR 110 may base the RUL on on the probability of mission success, and a conditional probability of a failure of the component wherein the conditional probability of failure is based in part on a mission relevant subjective probability estimate. Here, the MR 110 my determine and use a categorical scale of the RUL of the relevant component, the categorical being either a failed state, a degraded state, and a working sate.

For example, one causal factor may lead the logic to flow from one level to a next. Here, shaded arrows (arcs) may indicate causal actions moving the predictive decision aid logic from one to the next. In this example, a first mission may include heavy lift where a mission execution command may cause the heavy lift to become an actual task A. A degraded status within the mission may cause a mission actual task B where a mission status is now a replan causing an investigation into a component 0 of a subsystem 0. In this manner the causal BN may enable the MR 110 to determine not only a need for retasking but also why the retasking was necessary.

FIG. 6

Figure 6:
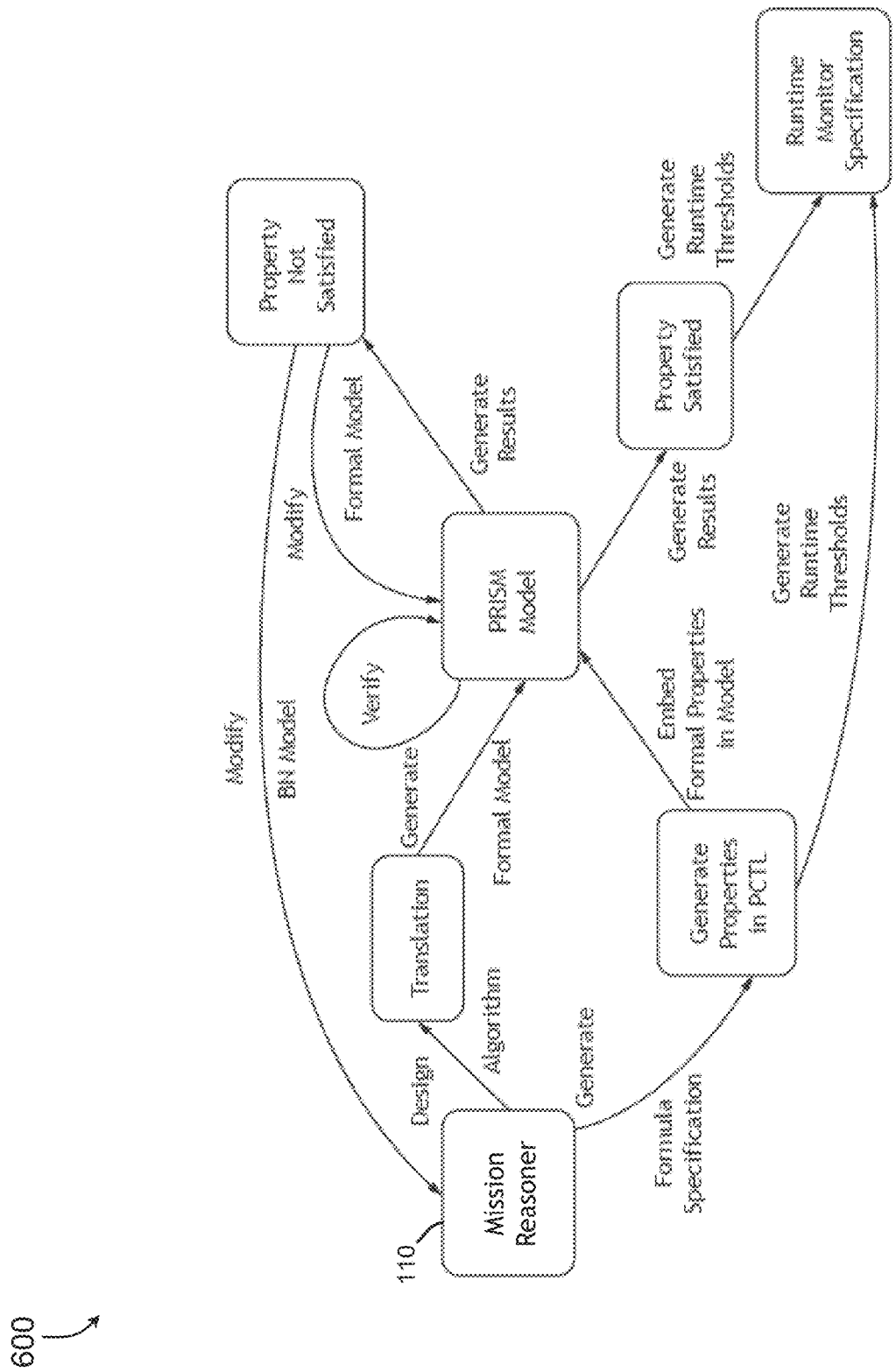
FIG. 6 is a diagram of an exemplary workflow for mission reasoner in accordance with one embodiment of the inventive concepts disclosed herein.

Referring now to FIG. 6, a diagram of an exemplary workflow for mission reasoner in accordance with one embodiment of the inventive concepts disclosed herein is shown. A mission reasoner process workflow 600 may indicate a flow of logic around a probabilistic model checker (e.g., PRISM) where the MR 110 operates to generate properties in an appropriate language such as probabilistic computation tree logic (PCTL) as well as translations then monitored by the PRISM model.

To ensure a high assurance for the MR 110, the system for automation of flight functions across an aircraft cockpit 100 may employ a verification and validation (V&V) approach to prove the correctness of the design, as modeled using the causal BN. A secondary desire may include generation of specifications for runtime monitoring. Here, a formal method-based V&V approach may exhaustively verify a satisfaction of the property by generating and evaluating all possible traces.

In one embodiment of the inventive concepts disclosed herein, once the knowledge graph is modeled in the causal BN, it may be translated into the formalisms of the verification framework which is guided by the representations in the probabilistic model checker (PMC). In parallel with the translation process, the formal properties which resemble the requirements for the MR 110 may also be formalized. The properties may be represented in PCTL, the specification language supported by the PMC. This may allow proving probabilistic path-based or state-based properties are satisfied by the MR 110. Once the model is represented in PMC and the properties are modeled in PCTL the model may be verified against the properties.

If the property is satisfied, based on the type of requirement represented by the property and based on the trace generated or reachable states within the probabilistic model, it may enable the generation of the specifications for the runtime monitor. If the property is not satisfied, the knowledge graph requirement or the formal model may be modified. Each predictive decision aid may be actively monitored with satisfied or unsatisfied properties. Where unsatisfied, the causal BN may modify the output to alter the predictive decision aid for the next decision.

FIG. 7

Figure 7:
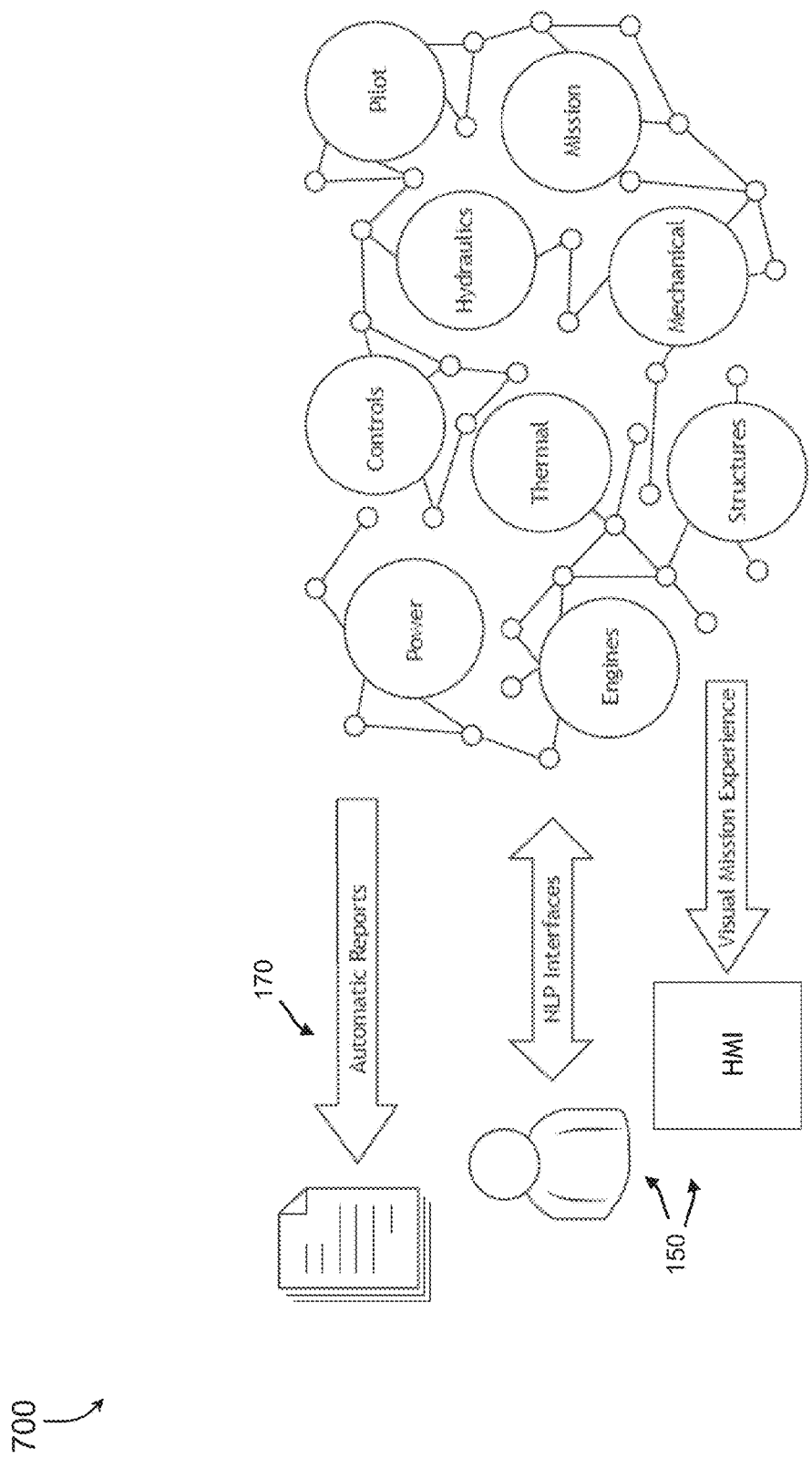
FIG. 7 a diagram of a mission ecosystem associated with one embodiment of the inventive concepts disclosed herein.

Referring now to FIG. 7, a diagram of a mission ecosystem associated with one embodiment of the inventive concepts disclosed herein is shown. A Mission Ecosystem 700 may include an expanded view of function of the MR 110. In one embodiment, the HMI 150 may include a natural language processing (NLP) interface enabling the MR 110 to communicate with a plurality of language speakers. An additional embodiment may include a visual mission experience available to a helmet mounted cuing system (HMCS) for effective communication to the pilot. Also, the VHS 180 may generate automatic reports to capture each event surrounding the mission execution.

FIG. 8

Figure 8:
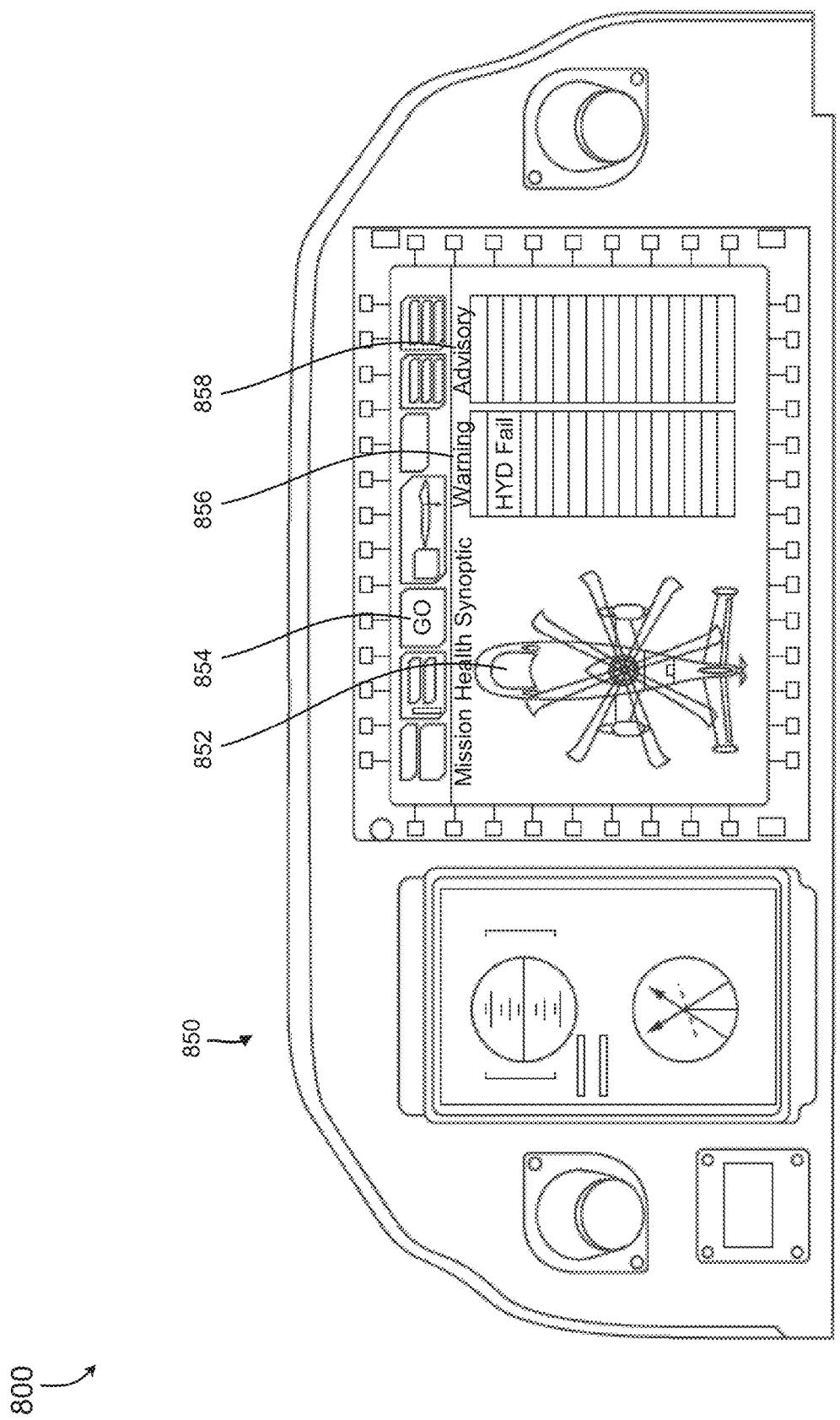
FIG. 8 is a diagram of a cockpit display exemplary of one embodiment of the inventive concepts disclosed herein.

Referring now to FIG. 8, a diagram of a cockpit display exemplary of one embodiment of the inventive concepts disclosed herein is shown. One exemplary HMI diagram 800 may include a forward panel 850 including an aircraft graphic 852, a mission status 854, a warning display 856, and an advisory display 858. The MR 110 may, via the HMI 150, communicate with the pilot enabling accurate predictive decision aid communication and status updates.

FIG. 9

Figure 9:
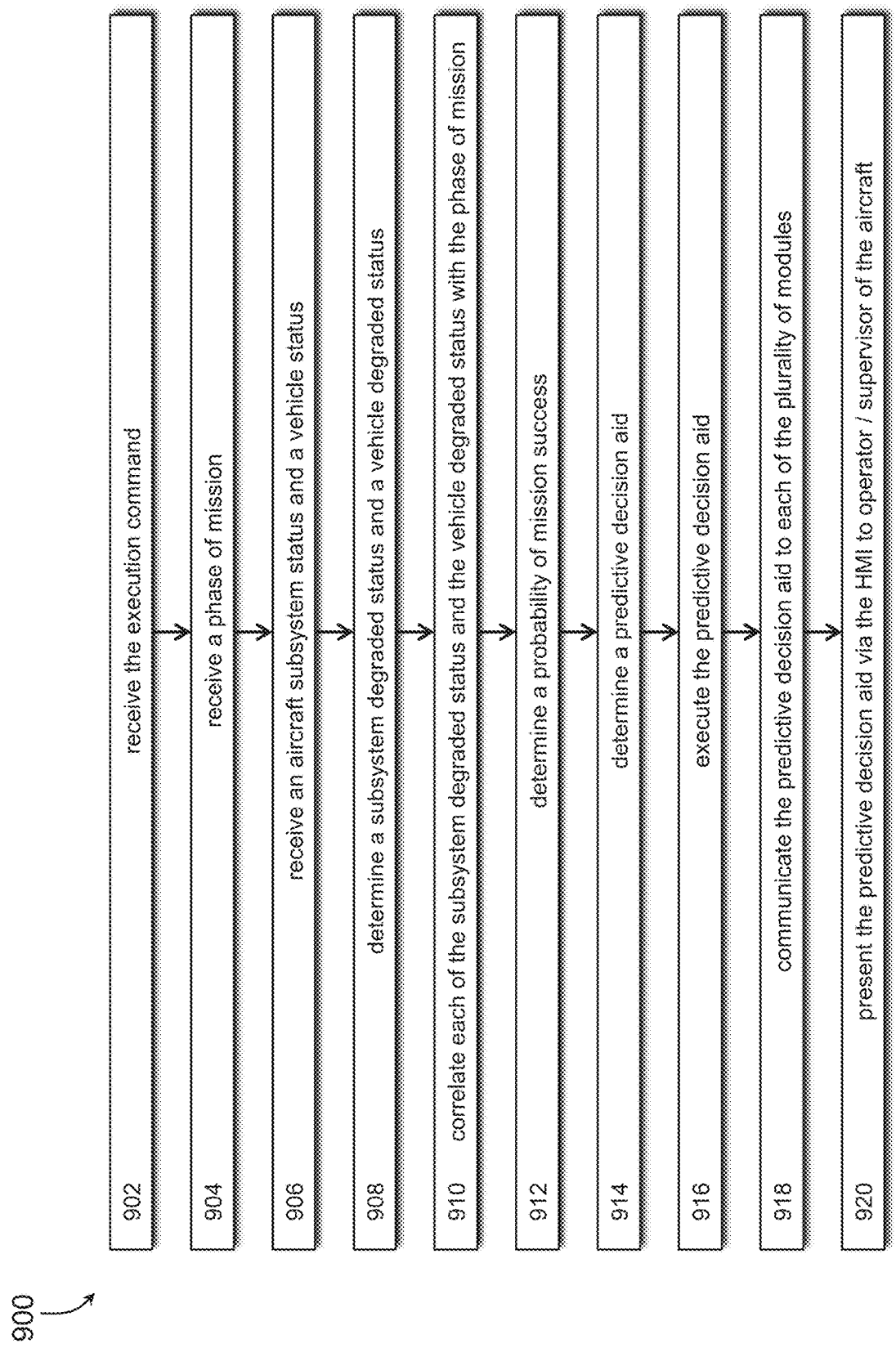
FIG. 9 is a diagram of a method flow exemplary of one embodiment of the inventive concepts disclosed herein.

Referring now to FIG. 9, a diagram of a method flow exemplary of one embodiment of the inventive concepts disclosed herein is shown. One exemplary method flow 900 for automation of flight functions across an aircraft cockpit may include, at a step 902, receiving an execution command of a mission and a mission execution status from a mission execution module and, at a step 904, receiving a phase of mission from a mission assessment module.

The method may include, at a step 906, receiving, from a vehicle health system, 1) a subsystem status of at least one subsystem onboard an aircraft and 2) a vehicle status of at least one vehicle of a plurality of vehicles offboard the aircraft, and, at a step 908, determining 1) a subsystem degraded status of the at least one subsystem onboard the aircraft based on the received subsystem status and 2) a vehicle degraded status of at least one vehicle of the plurality of vehicles offboard the aircraft based on the received vehicle status.

The method may include, at a step 910, correlating each of the subsystem degraded status and the vehicle degraded status with the phase of mission, and at a step 912, determining a probability of mission success based on the correlation. At a step 914, the method may include determining at least one predictive decision aid based on 1) the subsystem degraded status, 2) the vehicle degraded status, 3) the phase of mission, and 4) the probability of mission success, the at least one predictive decision aid configured to mitigate the subsystem degraded status and the vehicle degraded status associated with the probability of mission success, the at least one predictive decision aid one of: a subsystem procedure onboard the aircraft, a mission go of the mission, at least one mission retask of the mission, and a mission no go of the mission, and at a step 916, executing the at least one predictive decision aid one of: onboard the aircraft and offboard the aircraft.

The method may include at a step 918, communicating the at least one predictive decision aid to each of: a mission planning module, the mission execution module, a human machine interface (HMI) within a cockpit of the aircraft, the mission assessment module, and a mission experience module, and the vehicle health system, and at a step 920, presenting the at least one predictive decision aid via the HMI to one of an operator and a supervisor, of the aircraft.

CONCLUSION

As will be appreciated from the above description, embodiments of the inventive concepts disclosed herein may provide a novel solution to automation of flight functions and decision making across an aircraft cockpit to reduce pilot workload and enhance mission success.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for automation across an aircraft cockpit, comprising:
    a human machine interface (HMI) comprising a display screen;
    a controller coupled to an aircraft and the HMI;
    a tangible, non-transitory memory configured to communicate with the controller, the tangible, non-transitory memory comprising instructions that, in response to execution by the controller, cause the controller to be configured for:
        a plurality of modules, the plurality of modules comprising:
            a mission planning module configured for planning a mission;
            a mission execution module comprising an execution command of the mission and a phase of mission analysis, wherein the phase is indicative of at least one of a pre-mission phase, an enroute phase, or a target area phase;
            a mission assessment module configured to measure a mission performance against a benchmark indicative of successful performance; and
            a vehicle health system configured for monitoring at least one subsystem onboard the aircraft, the vehicle health system comprising a multi-vehicle health interface configured for monitoring a vehicle status of a plurality of vehicles offboard the aircraft;
        receive the execution command of the mission and a mission execution status from the mission execution module;
        receive a phase of mission from the mission assessment module;
        receive, from the vehicle health system, 1) a subsystem status of the at least one subsystem onboard the aircraft and 2) the vehicle status of at least one vehicle of the plurality of vehicles offboard the aircraft;
        determine 1) a subsystem degraded status of the at least one subsystem onboard the aircraft based on the received subsystem status and 2) a vehicle degraded status of at least one vehicle of the plurality of vehicles offboard the aircraft based on the received vehicle status;
        correlate each of the subsystem degraded status and the vehicle degraded status with the phase of mission;
        determine a probability of mission success based on the correlation;
        determine at least one predictive decision aid based on 1) the subsystem degraded status, 2) the vehicle degraded status, and 3) the phase of mission, and 4) the probability of mission success the at least one predictive decision aid one of: a subsystem procedure onboard the aircraft, a mission go of the mission, at least one mission retask of the mission, and a mission no go of the mission;
        execute the at least one predictive decision aid;
        communicate the at least one predictive decision aid to each of the plurality of modules; and
        present the at least one predictive decision aid via the HMI to one of:
    an operator and a supervisor of the aircraft,
    wherein the probability of mission success based on the correlation is a causal Bayesian analysis of: a useful life of at least one relevant component of the subsystem, an impact of the at least one relevant component on the probability of mission success, and a conditional probability of a failure of the at least one component.

2. The system for automation across an aircraft cockpit of claim 1, wherein the mission execution module further comprises a single pilot operation status.

3. The system for automation across an aircraft cockpit of claim 1, wherein the HMI onboard the aircraft further comprises one of a display screen, a voice recognition and communication system, a helmet mounted display, and an aural warning system.

4. The system for automation across an aircraft cockpit of claim 1, wherein the mission assessment module further comprises a completion analysis of the mission, a subtasks analysis of the mission, and a battle damage assessment of each of the aircraft and the at least one vehicle.

5. The system for automation across an aircraft cockpit of claim 1, wherein the tangible, non-transitory memory further comprises a knowledge database accessible in determining the probability of mission success.

6. The system for automation across an aircraft cockpit of claim 1, wherein the plurality of modules comprises a mission experience module further comprising a debrief of at least one mission subtask, and an event log of a mission timeline.

7. The system for automation across an aircraft cockpit of claim 1, wherein the at least one subsystem onboard the aircraft further includes one of: an engine, a hydraulic system, an electrical system, a pneumatic system, a flight control system, a weapon system, a sensor system, and a navigation system.

8. The system for automation across an aircraft cockpit of claim 1, wherein the conditional probability of failure is based at least in part on a categorical scale of a remaining useful life (RUL) of the at least one relevant component, the categorical scale one of: a failed state, a degraded state, or a working state.

9. The system for automation across an aircraft cockpit of claim 1, wherein the at least one mission retask further comprises at least one secondary task of one of the aircraft and the at least one vehicle based on an output of the mission planning module.

10. The system for automation across an aircraft cockpit of claim 1, wherein communicate the at least one predictive decision aid to each of the plurality of modules further comprises a communication of: 1) the predictive decision aid, 2) a reason for the predictive decision aid, 3) the subsystem degraded status associated with the predictive decision aid, 4) the vehicle degraded status associated with the predictive decision aid, and 5) a component part causing the subsystem degraded status.

11. A method for automation across an aircraft cockpit, comprising:
performing steps via a system, wherein the system comprises: a human machine interface (HMI) comprising a display screen; a controller coupled to an aircraft and the HMI; and a tangible, non-transitory memory configured to communicate with the controller, the tangible, non-transitory memory comprising instructions that, in response to execution by the controller, cause the controller to be configured for the steps, the steps comprising:
receiving an execution command of a mission and a mission execution status from a mission execution module;
receiving a phase of mission from a mission assessment module configured to measure a mission performance against a benchmark indicative of successful performance;
receiving, from a vehicle health system, 1) a subsystem status of at least one subsystem onboard an aircraft and 2) a vehicle status of at least one vehicle of a plurality of vehicles offboard the aircraft;
determining 1) a subsystem degraded status of the at least one subsystem onboard the aircraft based on the received subsystem status and 2) a vehicle degraded status of at least one vehicle of the plurality of vehicles offboard the aircraft based on the received vehicle status;
correlating each of the subsystem degraded status and the vehicle degraded status with the phase of mission;
determining a probability of mission success based on the correlation;
determining at least one predictive decision aid based on 1) the subsystem degraded status, 2) the vehicle degraded status, 3) the phase of mission, and 4) the probability of mission success, the at least one predictive decision aid one of: a subsystem procedure onboard the aircraft, a mission go of the mission, at least one mission retask of the mission, and a mission no go of the mission, wherein the phase is indicative of at least one of a pre-mission phase, an enroute phase, or a target area phase;
executing the at least one predictive decision aid;
communicating the at least one predictive decision aid to each of: a mission planning module, the mission execution module, a human machine interface (HMI) onboard the aircraft, the mission assessment module, and the vehicle health system; and
presenting the at least one predictive decision aid via the HMI to one of: an operator and a supervisor of the aircraft,
wherein the probability of mission success based on the correlation is a causal Bayesian analysis of: a useful life of at least one relevant component of the subsystem, an impact of the at least one relevant component on the probability of mission success, and a conditional probability of a failure of the at least one component.

* * * * *